United States Patent
Wang et al.

(10) Patent No.: US 10,244,385 B2
(45) Date of Patent: Mar. 26, 2019

(54) COVERAGE ENHANCEMENT HAVING CALL CONTINUITY

(71) Applicant: Verizon Patent and Licensing Inc., Arlington, VA (US)

(72) Inventors: Xin Wang, Morris Plains, NJ (US); Andrew E. Youtz, Princeton, NJ (US); Jeremy Nacer, Denville, NJ (US); Christopher M. Schmidt, Branchburg, NJ (US); Balaji L. Raghavachari, Bridgewater, NJ (US); Musa Kazim Guven, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 94 days.

(21) Appl. No.: 15/368,766

(22) Filed: Dec. 5, 2016

(65) Prior Publication Data

US 2018/0160298 A1    Jun. 7, 2018

(51) Int. Cl.
| | |
|---|---|
| *H04W 8/24* | (2009.01) |
| *H04W 48/14* | (2009.01) |
| *H04L 29/06* | (2006.01) |
| *H04W 8/08* | (2009.01) |
| *H04M 7/00* | (2006.01) |
| *H04W 4/70* | (2018.01) |
| *H04W 84/04* | (2009.01) |
| *H04W 76/27* | (2018.01) |
| *H04W 76/34* | (2018.01) |

(52) U.S. Cl.
CPC .......... *H04W 8/24* (2013.01); *H04L 65/1006* (2013.01); *H04L 65/1059* (2013.01); *H04M 7/006* (2013.01); *H04W 4/70* (2018.02); *H04W 8/08* (2013.01); *H04W 48/14* (2013.01); *H04W 76/27* (2018.02); *H04W 76/34* (2018.02); *H04W 84/042* (2013.01)

(58) Field of Classification Search
None
See application file for complete search history.

(56) References Cited

U.S. PATENT DOCUMENTS

| | | | |
|---|---|---|---|
| 9,906,991 B1* | 2/2018 | Peddiraju | H04W 76/28 |
| 2013/0015953 A1* | 1/2013 | Hsu | H04W 4/08 340/7.46 |
| 2015/0327327 A1* | 11/2015 | Jain | H04W 76/068 370/328 |
| 2016/0100380 A1* | 4/2016 | Jha | H04W 68/005 455/458 |

(Continued)

*Primary Examiner* — Jamal Javaid
*Assistant Examiner* — Rosene Clark

(57) ABSTRACT

A method for signaling and call continuity for coverage enhancement may include selecting a cell while a user equipment (UE) device is in a radio resource control (RRC) idle state, determining if a signal level from an evolved NodeB (eNodeB) associated with the cell is sufficient for normal coverage, exchanging data with a network in a normal UE device mode via the cell upon determining that the signal level is sufficient for normal coverage, determining if a signal level from the eNodeB associated with the cell is sufficient for enhanced coverage upon determining that the signal level is not sufficient for normal coverage, and exchanging data with the network in an enhanced UE device mode via the cell upon determining that the signal level is sufficient for enhanced coverage.

20 Claims, 9 Drawing Sheets

(56) References Cited

U.S. PATENT DOCUMENTS

| | | | |
|---|---|---|---|
| 2016/0316491 A1* | 10/2016 | Axmon | H04W 74/0833 |
| 2016/0353342 A1* | 12/2016 | Futaki | H04W 4/70 |
| 2017/0215065 A1* | 7/2017 | Vamanan | H04W 8/24 |
| 2018/0007673 A1* | 1/2018 | Fwu | H04W 4/70 |
| 2018/0048748 A1* | 2/2018 | Lundstrom | H04M 1/2535 |

* cited by examiner

COVERAGE ENHANCEMENT HAVING CALL CONTINUITY

BACKGROUND

As wireless network operators modernize their network infrastructure and transition away from legacy standards (such as, for example, standards using air interfaces relying upon code division multiple access (CDMA)), coverage gaps may arise as older standards are updated to newer, long term evolution (LTE) based standards. Accordingly, techniques for improving the coverage of LTE networks is an active area of interest as network operators work to close coverage gaps to prevent costly roaming for network users, and avoid coverage losses which may interrupt calls and/or data connectivity.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to user equipment devices (UEs) which may utilize multiple coverage modes to compensate for coverage gaps in a wireless network. When normal coverage is available from the wireless network, the UE may operate in a normal device mode. The normal UE device mode may correspond to a UE Category as set forth in 3GPP TS36.306, such as, for example, Category 1 or greater (herein referred to as "Cat-1+"). During a coverage gap, for example, when UE is operating within a large building having a structure that occludes or significantly attenuates wireless signals, the UE may switch coverage modes to exchange data with wireless networks that offer enhanced coverage.

Wireless networks may concurrently offer enhanced coverage modes along with normal coverage modes so a UE may switch between the two coverage modes as needed. Enhanced coverage modes may, for example, include techniques developed for machine type communications (MTC) for operation in an internet of things (IoT) environment. For example, embodiments may include techniques used in enhanced MTC (eMTC) featured in 3GPP Release 13, which introduces a bandwidth reduced, low complexity device category, referred to herein as "Cat-M1." Cat-M1 devices may include, among other features, repetition techniques at physical layer. In various embodiments, the eMTC physical layer enhancements for providing coverage enhancement may include sub-frame bundling techniques with HARQ, and/or new physical channel formats, in addition to the repetition techniques.

The repetition techniques enable the transmission and reception of signals in environments having large path loss and/or deep in-building penetration conditions, thus providing for an enhanced coverage mode. In other words, a UE operating in an enhanced UE device mode with a network providing enhanced coverage service may maintain a data connection with the wireless network in conditions that may not be possible when the UE is operating in a normal UE device mode with the wireless network providing normal coverage service.

Figure 1:
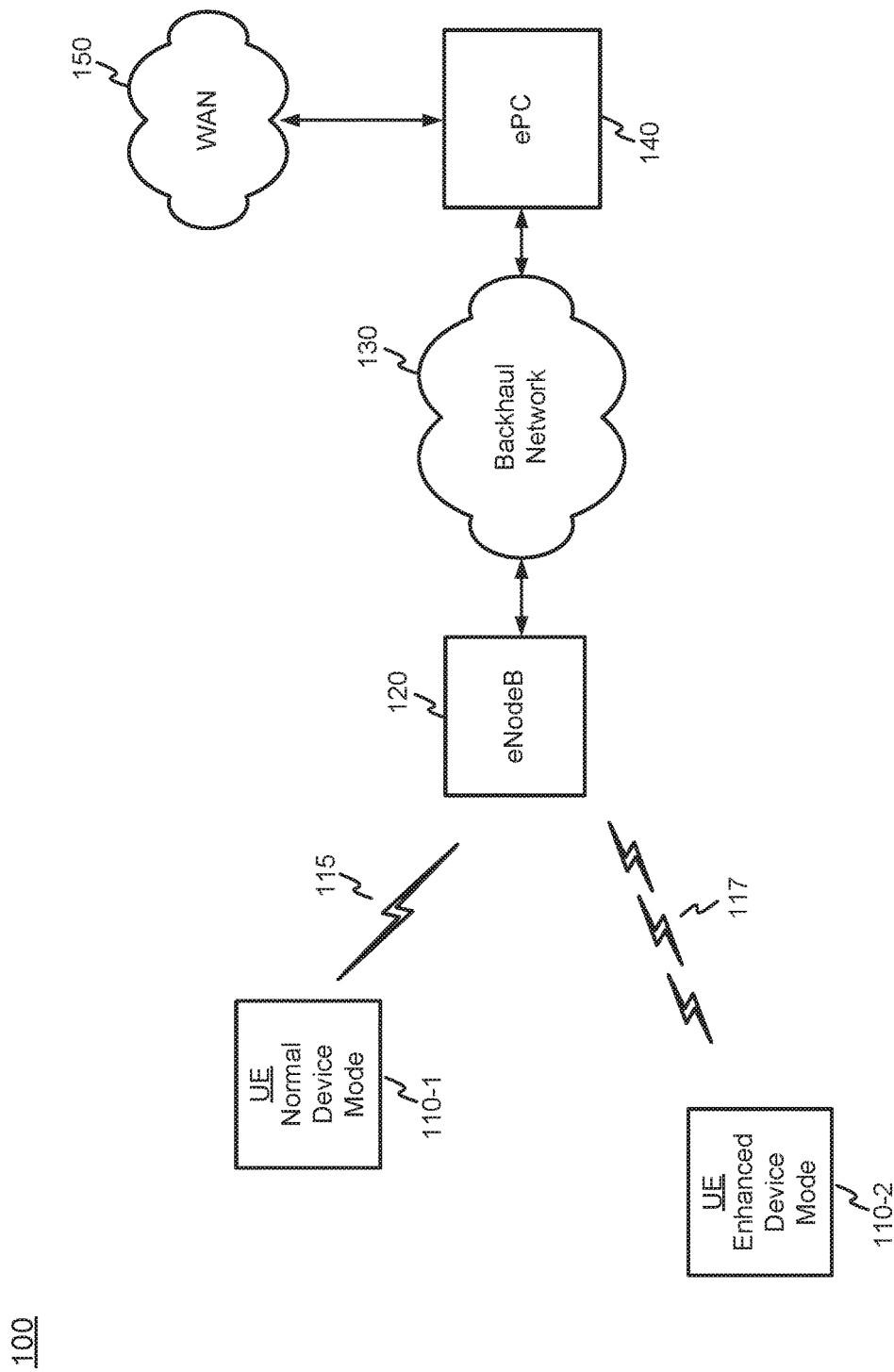
FIG. 1 is a diagram illustrating an exemplary network environment with a user equipment device (UE) that may switch between a normal and enhanced coverage modes.

FIG. 1 is a diagram illustrating an exemplary network environment 100 that includes a UE that may switch between normal and enhanced coverage modes. Network environment 100 may include a user equipment device (UEs) 110 (wherein "UE 110-1" operates in a normal UE device mode, and "UE 110-2" operates in an enhanced UE device mode), an evolved NodeB (eNodeB) 120, a backhaul network 130, an evolved packet core (ePC) 140, and a wide area network (WAN) 150. For ease of explanation, only one mobile device 110 (operating in two different modes) and a single eNodeB 120 are illustrated as being connected to ePC 140 through backhaul network 130. However, it should be understood that any number of mobile devices 110, eNodeBs 120, and/or other known network entities may be included in network environment 100.

UE 110 may wirelessly access ePC 140 though eNodeB 120 via backhaul network 130. Through ePC 140, UE 110 may obtain access to WAN 150 over any type of known cellular network, such as, for example, LTE, LTE Advanced, 5G, etc. As shown in FIG. 1, UE 110 may operate in multiple device modes using different types of wireless channels (115, 117), depending upon the coverage mode being used to access eNodeB 120.

For example, UE 110-1 may operate in a normal UE device mode that accesses eNodeB 120 using a normal coverage mode. Wireless access using normal coverage mode may be enabled through wireless channel 115, which corresponds to conventional physical layer protocols in accordance with 3GPP standards (e.g., LTE, LTE Advanced, 5G, etc.). UE 110-1 operates in normal UE device mode under conditions where wireless channel 115 is not significantly degraded due to the physical environment (e.g., building structures) and/or the electrical conditions (e.g. co-channel interference) associated with UE 110-1 during communications with eNodeB 120. For example, UE 110-1 may operate in a Cat-1+ mode as defined in 3GPP TS36.306.

Alternatively, UE 110 may determine when wireless channel 115 is degraded due to the physical environment and/or electrical conditions, and select a coverage mode to compensate for the degraded wireless environment to maintain connectivity with eNodeB 120. Accordingly, UE 110 may decide, based on signal conditions, to operate in an enhanced UE device mode, shown in FIG. 1 as UE 110-2, that accesses eNodeB 120 through a service operating in an enhanced coverage mode. Wireless access using the enhanced coverage mode may be enabled through wireless channel 117 corresponding to physical layer protocols associated with bandwidth reduced low complexity devices for eMTC/IoT communications. For example, wireless channel 17 may operate in accordance with the 3GPP Release 13 standard, and behaving like a Cat-M1 device.

Accordingly, network environment 100 may support UE 110 operating in a normal UE device mode (e.g., UE 110-1 as a Cat-1+ device), an enhanced UE device mode (e.g., UE 110-2 as a Cat-M1 device). In any mode, UE 110 may perform full duplex-frequency division duplex (FD-FDD), VoLTE, connected mode mobility, and LTE positioning. Enabling such features in the enhanced UE device mode helps maintain major functionalities expected by the user of UE when the device operates in enhanced UE device mode (e.g., Cat-M1 device). However, such features may operate with a reduced bandwidth and reduced peak date rate.

Upon encountering a coverage gap, a conventional UE may be disconnected and then go into roaming or use another radio access technology in order to reconnect with the wireless network. The disconnection may result in a reassignment of an internet protocol (IP) address one the UE reconnects with the wireless network. Accordingly, data exchanges will be interrupted between the UE and the wireless network due to the disconnection (e.g., voice over long term evolution (VoLTE) calls will lose continuity). Embodiments herein do not lose the data connection with the wireless network when changing coverage modes because a Tracking Area Update (TAU) signaling procedure may be used without detaching/re-attaching the UE from the network. In embodiments provided herein, the UE may switch coverage modes when in an RRC idle state. As will be described below in relation to FIG. 6, when the UE loses coverage and performs system loss scanning, the UE may consider both normal coverage modes and enhanced coverage modes as at the time the UE is in an RRC idle state.

The RRC may be considered a protocol that handles signaling between UE 110 and the radio access network. RRC states (e.g., idle, connected, etc.) may be handled by the control plane which includes the RRC layer. During RRC idle mode, UE 110 may camp on a cell after cell selection or reselection takes place, where factors such as, for example, radio link quality, cell status, and radio access technology may be considered. As used herein "camping" on a selected cell refers to UE 110 maintaining data exchanges with the LTE network within the confines of the selected cell. UE 110 may also monitor a paging channel to detect incoming calls and acquire system information. In the idle mode, the control plane protocols include cell selection and reselection procedures. During RRC connected mode, UE 110 may provide the eUTRAN with downlink channel quality and neighbor cell information so the eUTRAN may assist UE 110 to select the most suitable cell.

UE 110 may include any type of mobile device having multiple coverage mode capabilities, and thus communicate with the appropriate eNodeBs 120 using a variety of different wireless channels (e.g., 115, 117) corresponding to the different coverage modes. UE 110 may be a mobile device that may include, for example, a cellular radiotelephone, a smart phone, a tablet, a set-top box (STB), a mobile phone, any type of internet protocol (IP) communications device, a Voice over Internet Protocol (VoIP) device, a laptop computer, a palmtop computer, a wearable computer, a gaming device, a media player device, or a digital camera that includes communication capabilities (e.g., wireless communication mechanisms such as Wi-Fi). In various embodiments, the wireless channel 115 and/or wireless channel 117 may be supported by any appropriate cellular radio access network (RAN), such as, for example, an LTE evolved universal terrestrial radio access network (eUTRAN). In other embodiments, the wireless channels 115 and/or 117 may be supported by a local or wide area wireless network. A local area wireless network may include any type of WiFi (e.g., any IEEE 802.11x network, where x=a, b, c, g, and/or n). A wide area wireless network may include any type wireless network covering larger areas, and may include a mesh network (e.g., IEEE 802.11s) and/or or a WiMAX IEEE 802.16. Details of an embodiment of a UE are discussed below in reference to FIG. 4.

EnodeB 120 may be configured to operate in multiple coverage modes (including normal and enhanced coverage modes) in accordance with one or more known wireless standards. EnodeB 120 may be reconfigurable with respect to improvements of existing standards and future standards for any type of radio access network, and can be compatible with known wireless standards. Such standards may include, for example, LTE, LTE Advanced, 5G, etc. In some embodiments, eNodeB 110 may be a wireless access point which can service any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16.

Backhaul network 130 may be any type network that supports one or more central offices 140 for interfacing with ePC 140. Backhaul network 130 may include Cell Site Routers (CSRs), Extended Back Haul (EBH) network(s), optical networks that include wavelength division multiplexed (WDM) optical components, multiservice provisioning platforms (MSPPs), metro-Ethernet networks, multiprotocol label switching (MPLS) networks, optical transport networks (OTN), etc.

EPC 140 may be a core networking infrastructure that provides mobility management, session management, authentication, and packet transport to support UE 110 and eNodeB 120 for wireless communication, and further provides wireless networking elements access to WAN 150. ePC 140 may be compatible with known wireless standards which may include, for example, LTE, LTE Advanced, 3GPP 5G, Global System for Mobile Communications (GSM), Universal Mobile Telecommunications System (UMTS), IS-2000, etc.

WAN 150 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Additionally, embodiments described herein may be presented within the context of the Long Term Evolution (LTE) wireless standard for ease of explanation. However, aspects of the invention are not restricted to the LTE standard, and may be applied to other networking standards, such as, for example, LTE Advanced, 3GPP 5G, 3GPP2, etc.

Figure 2:
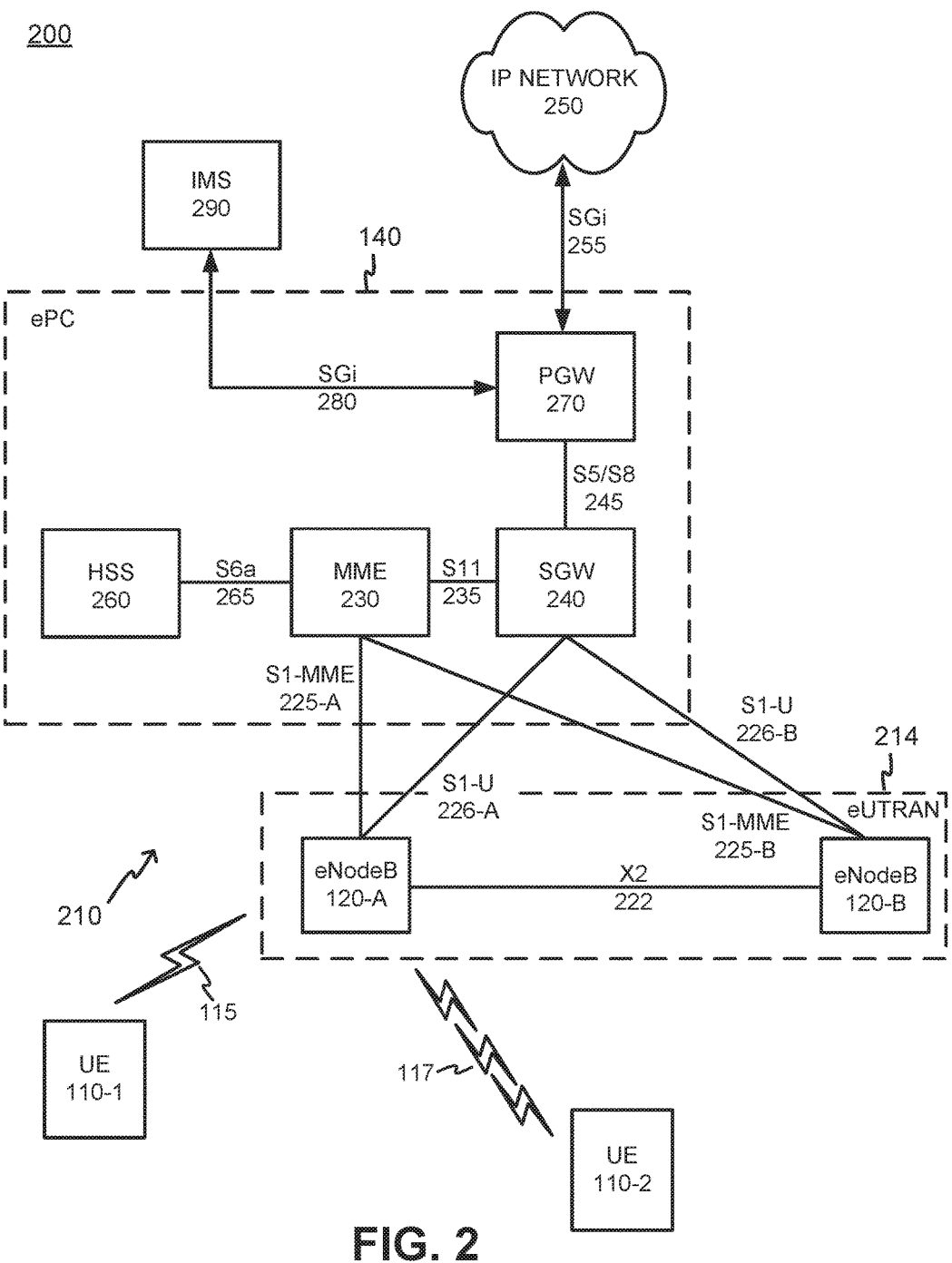
FIG. 2 is a block diagram of a networking system 200 showing exemplary components of an evolved Packet Core (ePC)

FIG. 2 is a block diagram of a networking system 200 showing exemplary components of evolved Packet Core (ePC) 140. Networking system 200 may include mobile device 110 (shown operating in normal UE device mode as UE 110-1 and operating in enhanced UE device mode as UE 110-2) with LTE network 210. LTE network 210 may include evolved Packet Core (ePC) 140 and an evolved Universal Mobile Telecommunications System (UMTS) Terrestrial Network (eUTRAN) 214. Networking system 200 may further include an Internet Protocol (IP) network 250, which may be embodied separately or included in back haul network 130 and/or WAN 150, and an internet protocol multimedia system (IMS) 290.

LTE network 210 may include one or more devices that are physical and/or logical entities interconnected via standardized interfaces. LTE network 210 provides wireless packet-switched services and wireless IP connectivity to user devices to provide, for example, data, voice, and/or multimedia services. The ePC 140 may further include a mobility management entity (MME) 230, a serving gateway (SGW) device 240, a packet data network gateway (PGW) 270, and a home subscriber server (HSS) 260. The eUTRAN 214 may further include one or more eNodeBs 120-A and 120-B It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, each eNodeB 120 may include one or more devices and other components having functionality that allows UE 110 to wirelessly connect to eUTRAN 214. ENodeB 120 may interface with ePC 140 via a S1 interface, which may be split into a control plane S1-MME interface 225 and a data plane S1-U interface 226. S1-MME interface 225 may interface with MME 230. S1-MME interface 225 may be implemented, for example, with a protocol stack that includes a Non-Access Stratum (NAS) protocol and/or Stream Control Transmission Protocol (SCTP). S1-U interface 226 may interface with SGW 240 and may be implemented, for example, using a General Packet Radio Service Tunneling Protocol (GTP). ENodeB 120-A may communicate with eNodeB 120-B via an X2 interface 222. X2 interface 222 may be implemented, for example, with a protocol stack that includes an X2 application protocol and SCTP.

MME 230 may implement control plane processing for LTE wireless network 210. For example, MME 230 may implement tracking and paging procedures for UE 110, may activate and deactivate bearers for UE 110, may authenticate a user of UE 110 provide normal coverage service for operations with UE 110-1 operating in normal UE device mode, provide enhanced coverage service for operations with UE 110-2 operating in enhanced UE device mode, and may interface to non-LTE radio access networks. MME 230 may also select a particular SGW 240 for a particular UE 110. A particular MME 230 may interface with other MMEs 230 in ePC 212 and may send and receive information associated with UEs 110, which may allow one MME 230 to take over control plane processing of UEs serviced by another MME 230, if the other MME becomes unavailable.

SGW 240 may provide an access point to and from UE 110, may handle forwarding of data packets for UE 110, and may act as a local anchor point during handover procedures between eNodeBs 320. SGW 240 may interface with PGW 270 through an S5/S8 interface 245. S5/S8 interface 245 may be implemented, for example, using GTP.

PGW 270 may function as a gateway to IP network 250 through a SGi interface 255. IP network 250, which may provide various services (e.g., over the top voice services) to UE 110. A particular UE 110, while connected to a single SGW 240, may be connected to multiple PGWs 250, one for each packet network with which UE 110 communicates.

Alternatively, UE 110 may exchange data with IP network 250 though a WiFi wireless access point (WAP) (not shown). The WiFi WAP may be part of a local area network, and access IP network 250 through a wired connection via a router. Alternatively, the WiFi WAP 225 may be part of a mesh network (e.g., 802.11s). The WiFi WAP may be part of a local area network, or part of a wide area network (WiMAX) or a mesh network (802.11s).

MME 230 may communicate with SGW 240 through an S11 interface 235. S11 interface 235 may be implemented, for example, using GTPv2. S11 interface 235 may be used to create and manage a new session for a particular UE 110. S11 interface 235 may be activated when MME 230 needs to communicate with SGW 240, such as when the particular UE 110 attaches to ePC 212, when bearers need to be added or modified for an existing session for the particular UE 110, when a connection to a new PGW 270 needs to created, or during a handover procedure (e.g., when the particular UE 110 needs to switch to a different SGW 240).

HSS 260 may store information associated with UEs 110 and/or information associated with users of UEs 110. For example, HSS 260 may store user profiles that include registration, authentication, and access authorization information. For example, HSS 260 may associate user subscription to service plans to specific MDNs. MME 230 may communicate with HSS 260 through an S6a interface 265. S6a interface 265 may be implemented, for example, using a Diameter protocol.

IMS 290 may provide an architectural framework and network devices to support for the delivery of multimedia applications and/or voice services over an IP transport (e.g. VoLTE), which may include applications/services based on Session Initiation Protocol (SIP). IMS 290 may serve as an overlay network above underlying networks to provide interoperability among IP enable network devices. IMS 290 may provide for a standardized function as a gateway to IP network 250 through a SGi interface 255 with PGW 270. The architecture of IMS 290 may include three separate layers: the connectivity layer, the control layer and the service layer. The connectivity layer may include routers, switches and access elements that may be positioned at the edge of LTE wireless network 210. The connectivity layer is the layer at which individual users are connected to the network via UE 110. The control layer includes control network devices, such as, for example, control servers that may manage call and/or data session set-up, modification and disconnect/release. Examples of a control network device include a call session control function (CSCF). The CSCF may function as a SIP server that may handle call set-up between UE 110. The service layer, which may also be referred to as the application layer, may include content and/or application provider devices (e.g., servers) that may provide enhanced service features for IMS-enabled networks. Based on this architecture, providers may offer session based application services (e.g., SMS messaging).

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
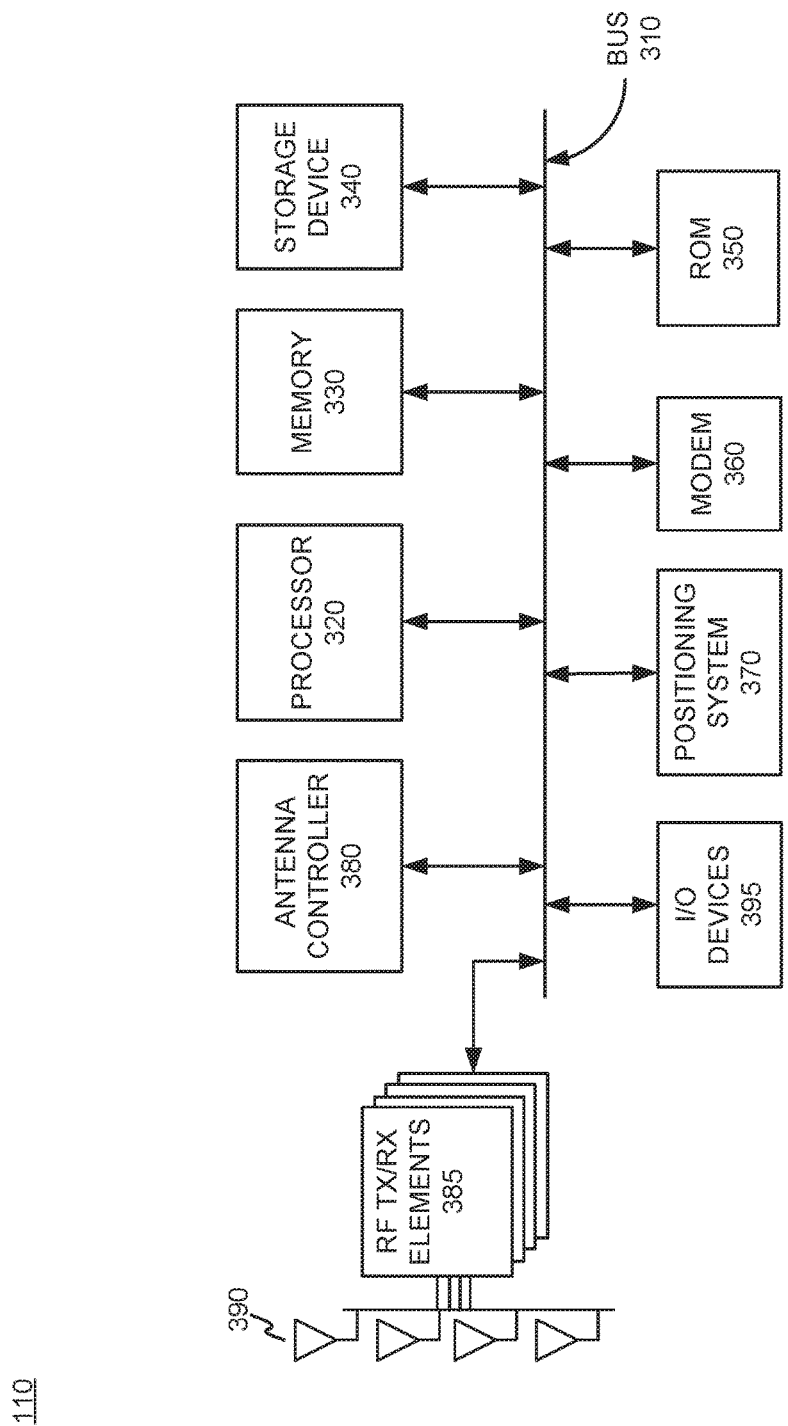
FIG. 3 is a block diagram showing exemplary components of a UE according to an embodiment.

FIG. 3 is a block diagram showing exemplary components of UE 110 according to an embodiment. UE 110 may include any type of electronic mobile device having communication capabilities, and thus communicate over networks using a variety of different channels, including channels having wired and/or wireless connections. UE 110 may include, for example, a cellular radiotelephone, a smart phone, a tablet, a set-top box (STB), a mobile phone, a Voice over Internet Protocol (VoIP) device, a laptop computer, a palmtop computer, a gaming device, a media player device, or a digital camera that includes communication capabilities (e.g., wireless communication mechanisms). Further referring to FIG. 3, UE 110 may include bus 310, processor 320, memory 330, storage device 350, ROM 350, modem 360, positioning system 370, antenna controller 380, radio frequency transmit/receive RF TX/RX elements 385, antenna array 390, and I/O devices 395. In another embodiment, UE 110 may only have one antenna and an associated RF TX/RX module, and may not require antenna controller 280. Bus 310 may interconnect each of the components of mobile device 110 either directly or indirectly to exchange commands and/or data.

Processor 320 may include a processor, microprocessor, or processing logic that may interpret and execute instructions. Memory 330 may include a random access memory (RAM) or another type of dynamic storage device that may store information and instructions for execution by processor 320. Storage device 340 may include a persistent solid state read/write device, a magnetic, and/or optical recording medium and its corresponding drive. ROM 350 may include a ROM device or another type of static storage device that may store static information and instructions for use by processor 320.

Modem 360 may perform various communications and signal processing operations allowing for UE 110 to efficiently communicate over the network. Modem 360 may perform signal conditioning (e.g., filtering), signal encoding and decoding (e.g., OFDMA), signal modulation and demodulation (e.g, BPSK, M-PSK, M-QAM, etc.), and/or error correction for data being transferred over the access stratum. Modem 360 may also operate in the non-access stratum and thus facilitate signaling and coordination with network devices in wireless access network to manage the establishment of communication sessions and for maintaining continuous communications.

Positioning system 370 may include a variety of receivers, sensors, and/or processors to provide relative and/or absolute position and orientation data of UE 110. For example, positioning system 370 may include a satellite navigation system, such as, for example, global positioning system (GPS) component, which may provide position information in relation to a standard reference frame. Position information may include rectangular coordinates in the world geodetic system 1985 (WGS84) frame (in either two or three dimensions), geodic coordinates such as latitude, longitude, and altitude, and/or other suitable positioning data. In another embodiment, positioning system may include an internal measurement unit (IMU) to determine relative displacements based on measured accelerations, and/or gyroscopes to measure angular displacements such as the roll, pitch, and yaw of the mobile device. Position system 370 may further include sensors, such as magnetometers, which may be used to determine orientation in a reference frame, such as, for example, the angular orientations with respect to magnetic and/or true north.

Antenna controller 380 may accept data for transmission from processor 320 and/or modem 360, and perform TX MIMO encoding if required to produce multiple channels of data for a set of the antenna elements in antenna array 390, which may be transmitted over an uplink via wireless channel 115 in normal coverage mode, and wireless channel 117 in enhanced coverage mode. Signals which have been received in a downlink, via wireless channel 115 in normal coverage mode or wireless channel 117 in enhanced coverage mode, over antenna array 290 may be decoded using RX MIMO decoding to combine streams into fewer data channels or a single received channel. Antenna controller 380 may further apply beamforming weights (which perform relative phase, frequency, and amplitude modulations between the antenna elements) on the transmit data streams to electronically adjust the transmit antenna pattern. Additionally, antenna controller 380 may apply beamforming weights on the receive data streams to electronically adjust the receive antenna pattern. Such adjustments may include main lobe pointing (the antenna pattern's main lobe may also be referred to herein as the "antenna beam," the "beam," or the "main beam"). Other adjustments may include "forming nulls" which may include pointing side lobe nulls in a particular direction and/or changing the side lobe pattern to alter the placement and/or depth of antenna pattern nulls. Moreover, when transmitting or receiving in enhanced coverage mode, antenna controller 380 may perform additional processing to improve the reliability and or signal-to-noise ratio of the wireless channel 117 when UE 110 operates in an environment which presents challenging signal conditions that would significantly degrade wireless channel 115 operating in normal coverage mode.

RF TX/RX elements 385 may include discreet RF elements to amplify, frequency demodulate (e.g., down convert) analog channels received over antenna array 390, and convert the analog channels to received digital streams using analog to digital converters. The received digital streams may be passed to antenna controller 380 which may further perform RX MIMO processing to combine MIMO streams. RF TX/RX elements 385 may further process transmit digital streams, which may be TX MIMO encoded by antenna controller 380 prior to being converted to analog signals using digital to analog converters. The analog signals may be frequency upconverted and amplified for transmission by RF TX/RX elements 385, and subsequently radiated by antenna array 390.

Antenna array 390 may include at least two antenna elements which have independent channels that may be used for electronic adjustments of both the transmit and receive antenna patterns, and/or also for transmit and/or receive MIMO processing to improve wireless channel reliability and/or throughput.

I/O devices 395 may include one or more mechanisms that permit an operator to input information to UE 110, such as, for example, a keypad or a keyboard, a microphone, voice recognition and/or biometric mechanisms, etc. I/O devices 395 may also include one or more mechanisms that output information to the operator, including a display, a speaker, etc.

UE 110 may perform certain operations or processes, as may be described in detail below. UE 110 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium, such as storage device 340, or from another device via the network. The software instructions contained in memory 340 may cause processor 320 to perform operations or processes that will be described in detail with respect to FIGS. 5, and 6-8. Alternatively, hardwired circuitry may be used in place of or in combination with software instructions to implement processes consistent with the principles of the embodiments. Thus, exemplary implementations are not limited to any specific combination of hardware circuitry and software.

The configuration of components of UE 110 illustrated in FIG. 3 is for illustrative purposes only. It should be understood that other configurations may be implemented. Therefore, UE 110 may include additional, fewer and/or different components than those depicted in FIG. 3.

Figure 4:
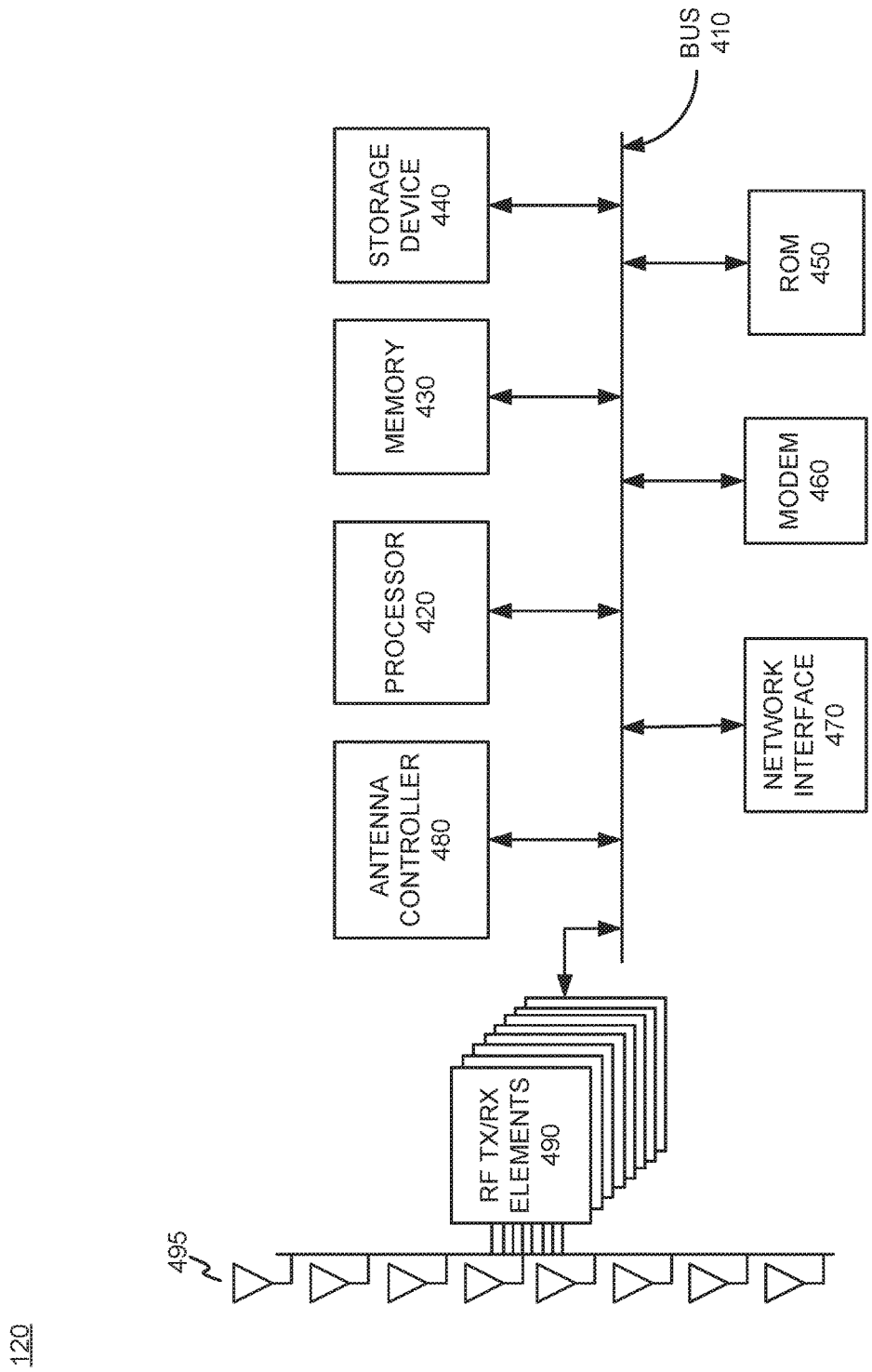
FIG. 4 is a block diagram showing exemplary components of an eNodeB according to an embodiment.

FIG. 4 is a block diagram showing exemplary components of an eNodeB 120 according to an embodiment. ENodeB 120 may provide wireless access to UE 110 using various wireless protocols, such as, for example, 3GPP 5G, LTE, LTE Advanced, etc. A single eNodeB 120 may serve one or more sectors, where each sector may provide different areas of coverage that may overlap. A particular sector may also transmit and/or receive on one or more predefined carrier frequencies, where the combination of a sector and a particular carrier frequency may be referred to as a "cell."

ENodeB 120 may further provide wireless and/or wireless network connectivity to other devices connected to evolved Packet Core (ePC) 140 (through, for example, a backhaul network), and network devices connected to wide area networks (e.g., the Internet). ENodeB 120 may include a processor 420, a memory 430, a storage device 440, a ROM 450, a modem 460, a network interface 470, RF TX/RX elements 490, and an antenna array 495. In another embodiment, eNode B 120 may only have one antenna and an associated RF TX/RX module, and may not require antenna controller 480. The components of eNodeB 120 may interface (either directly or indirectly) to a bus 410 to exchange data.

Processor 420 may include one or more processors, microprocessors, application specific integrated circuits (ASICs), field programmable gate arrays (FPGAs), and/or other processing logic that may interpret and execute instructions and/or low level logic. Processor 420 may control operation of eNodeB 120 and its components. Memory 430 may include a random access memory (RAM) or another type of dynamic storage device to store data and instructions that may be used by processor 420. Storage device 440 may include a persistent solid state read/write device, a magnetic, and/or optical recording medium and its corresponding drive. ROM 450 may include a ROM device or another type of static storage device that may store static information and instructions for use by processor 420.

Modem 460 may perform various communications and signal processing operations allowing for eNodeB 120 to efficiently communicate over the wireless network. Modem 460 may also perform processing to facilitate communications over the back haul network. Modem 460 may perform signal conditioning (e.g., filtering), signal encoding and decoding (e.g., OFDMA), signal modulation and demodulation (e.g, BPSK, M-PSK, M-QAM, etc.), and/or error correction for data being transferred over the access stratum. Modem 460 may use different signal processing approaches depending upon the coverage mode of the UE. For example, when eNodeB 120 provides service to a UE in enhanced coverage mode, modem 460 may apply techniques to enable the physical layer standards provided for eMTC devices in 3GPP Release 13, which may be associated with bandwidth reduced, low complexity Cat-M1 type devices. Modem 460 may also operate in the non-access stratum and thus facilitate signaling and coordination with network devices in wireless access network to manage the establishment of communication sessions and for maintaining continuous communications. The modem and processor may function together facilitate the operations of eNodeB 120 in accordance with a variety of wireless and/or wired communication protocols.

Network interface 470 may include a logical component that includes input and/or output ports, input and/or output systems, and/or other input and output components that facilitate the transmission of data to other devices via the backhaul network. Network interface 470 may include a network interface cards (e.g., Ethernet card) for wired communications and/or a wireless network interface (e.g., a WiFi) card for wireless communications and/or microwave interfaces for communications with other base stations and/or the backhaul network. Such communication standards may include, for example, local area network(s) (LAN) (e.g., WiFi), wireless wide area networks (WAN), and/or one or more wireless public land mobile networks (PLMNs). The PLMN(s) may include 5G systems, which may operate at higher frequencies, such as, for example, 5 GHz, 28 GHz, etc. The PLMN may further include a Global System for Mobile Communications (GSM) PLMN, a Long Term Evolution (LTE) PLMN, and Advanced LTE PLMN, and/or other types of PLMNs not specifically described herein. The back end network may exchange data with the wireless access network(s) to provide access to various servers, gateways, etc. The back end network may include a wide area network (WAN), a metropolitan area network (MAN), an intranet, the Internet, a wireless satellite network, a cable network (e.g., an optical cable network), etc.

Antenna controller 480 may accept data and/or commands (e.g. pointing and/or beamforming commands) from processor 420 and/or modem 460. Antenna controller 480 may perform TX MIMO encoding to produce multiple channels of data, for a set of the antenna elements in antenna array 495, which may be transmitted over a downlink channel. Signals which have been received over an uplink channel via antenna array 495 may be decoded using RX MIMO decoding to combine streams into fewer data channels or a single received channel. Antenna controller 480 may further apply beamforming weights (which perform relative phase, frequency, and amplitude modulations between the antenna elements) on the transmit data streams to electronically adjust the transmit antenna pattern. Additionally, antenna controller 380 apply beamforming weights on the receive data streams to electronically adjust the receive antenna pattern.

RF TX/RX elements 490 may include discreet RF elements to amplify, frequency demodulate (e.g., down convert) analog channels received via an uplink channel through antenna array 495, and convert the analog channels to received digital streams using analog to digital converters. The received digital streams may be passed to antenna controller 480 which may further perform RX MIMO processing to combine MIMO streams. RF TX/RX elements 490 may further process transmit digital streams, which may be TX MIMO encoded by antenna controller 480 prior to being converted to analog signals using digital to analog converters. The analog signals may be frequency upconverted and amplified for transmission at RF TX/RX elements 490, and subsequently radiated by antenna array 495, over a downlink channel.

Antenna array 495 may include a number of antenna elements in order to serve multiple sectors and/or to provide various antenna characteristics (e.g., antenna beamwidth, gain, side lobe control, etc.) appropriate for eNodeB 120 operations. The antenna elements may have independent channels that may be used for electronic adjustments of both the transmit and receive antenna patterns, and/or also for transmit and/or receive MIMO processing to improve wireless channel reliability and/or throughput. In an embodiment, antenna elements 495 may be "grouped" (though physical and/or electronic arrangement) and designated for communication with mobile devices within a particular sector of eNodeB's 120 overall coverage. The sector may be divided into angular segments (measured in a horizontal plane) pointing in different directions in order to distribute coverage for eNodeB 120. For example, antenna elements 495 may be grouped in a triangular arrangement so each side of the triangle serves a 120-degree sector. The antenna pattern, generated by the antenna elements associated with a particular sector, may be characterized by angles (e.g., azimuth and elevation) defined by a sector reference direction for the sector. The sector reference direction may be specified by a vector extending from a reference point associated with the sector.

As described herein, eNodeB 120 may perform certain operations in response to processor 420 and/or modem 460 executing software instructions contained in a computer-readable medium, such as memory 430. A computer-readable medium may be defined as a non-transitory memory device. A non-transitory memory device may include memory space within a single physical memory device or spread across multiple physical memory devices. The software instructions may be read into memory 430 from another computer-readable medium or from another device via network interface 470. The software instructions contained in memory 430 may cause processor 420 to perform processes which include enabling both normal coverage mode and enhanced coverage mode. Alternatively, hardwired circuitry may be used in place of, or in combination with, software instructions to implement processes described herein. Thus, implementations described herein are not limited to any specific combination of hardware circuitry and software.

Although FIG. 4 shows example components of eNodeB 120, in other implementations, eNodeB 120 may include fewer components, different components, differently arranged components, or additional components than those depicted in FIG. 4. Additionally, or alternatively, one or more components of eNodeB 120 may perform the tasks described as being performed by one or more other components of eNodeB 120.

Figure 5:
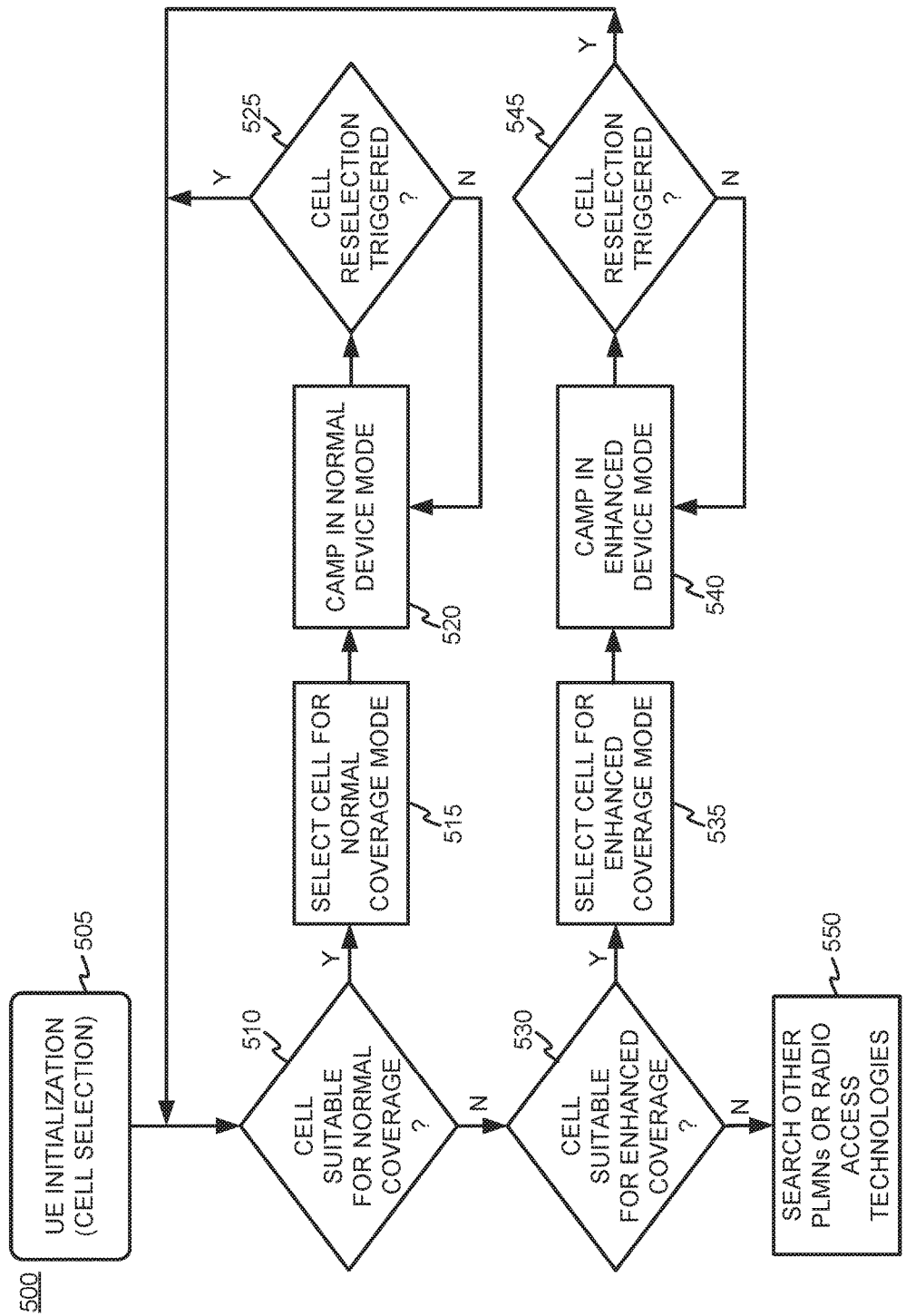
FIG. 5 is a flow chart showing an exemplary process for cell selection and/or reselection which may be performed by a UE.

FIG. 5 is a flow chart showing an exemplary process 500 for cell selection and/or reselection which may be performed by UE 110 on either a home public land mobile network (HPLMN) and/or an Equivalent HPLMN (EHPLMN). In an embodiment, process 500 may be performed by processor 320 executing instructions stored in memory 330, mass storage device 340, and/or ROM 350. Cell selection may start upon processor 320 in UE 110 being initialized upon being powered up, from either from cold boot (power initialization from an off state) or from a warm boot (repowering a portion of the processor upon waking from sleep to transition to a fully active state) (Block 505). Alternatively, as described below, portions of process 500 may also be performed upon cell reselection after UE 110 has camped on a cell in an RRC idle state.

In order to efficiently manage LTE network 210, UE 110 may measure parameters associated with a current cell to which the UE is attached, as well as the neighboring cells to make a decision to camp on the cell providing the strongest signal. The key parameters of the cell, for example, those found in the master information block (MIB) and the system information block (SIB), may be measured for the intra-frequency and inter-frequency neighboring cells. The measurements may be tracked and uploaded to the RRC layer which makes control decisions on which cell UE 110 is to camp. Accordingly, cell selection/reselection may be based on a number of levels of criteria, which may include absolute priority, radio link quality, and/or cell accessibility. In addition, processor 320 may perform cell selection after losing coverage from a cell which UE 110 had previously been attached. UE 110 may support cell selection and/or cell reselection in both normal coverage and enhanced coverage, with the latter specified in Sections 5.2.3.2 and/or 5.2.4.6a of Release 13 version of 3GPP TS 36.304.

During cell selection and/or reselection, processor 320 may search for a suitable cell providing normal coverage (Block 510). The selection may be based upon an appropriate signal level and/or messages consistent with normal coverage mode. If a suitable cell offering normal coverage is found, processor 320 may select the cell providing normal coverage (Block 515). Processor 320 may then instruct UE 110 to camp on the selected cell while operating in the normal UE device mode (Block 520). When UE 110 is camped in normal coverage, UE 110 may follow the normal random access procedure for Cat-1+ device. When device is in Cat-1+ mode, UE 110 may follow normal paging procedures for Cat-1+ device.

Processor 320 may then monitor signal and/or message conditions (e.g., information contained in system information blocks (SIBs) and/or master information blocks (MIBs)), and further based upon absolute priority, determine whether cell reselection should be triggered (Block 525). If cell reselection is not triggered, processor 320 will instruct UE to remain camped in normal coverage mode. If cell reselection is triggered in Block 525, processor may transfer control to Block 510 to determine if another cell providing normal coverage mode is available.

If in Block 510 processor 320 determines that no suitable cell providing normal coverage is available, processor 320 may then search for cells providing enhanced coverage (Block 530). The selection may be based upon an appropriate signal level and/or message conditions (e.g., information contained in SIBs and/or MIBs) consistent with enhanced coverage mode. If a suitable cell offering enhanced coverage is found, processor 320 may select the cell providing enhanced coverage (Block 535). Processor 320 may then instruct UE 110 to camp on the selected cell while operating in the enhanced UE device mode (Block 540). When UE 110 is camped in enhanced UE device mode, UE 110 may acquire the bandwidth reduced (BR) version of system information block (SIB) and system information (SI) messages, and may follow the enhanced random access procedure for a Cat-M1 device depending on coverage enhancement level. When UE 110 is in a Cat-M1 mode, the device supports enhanced paging for Cat-M1 devices, and may support ceModeA and/or ceModeB. The paging strategy may be determined by network.

Processor 320 may then monitor signal and/or message conditions, and further based upon absolute priority, determine whether cell reselection should be triggered (Block 545). In an embodiment, cell ranking may be applied for inter-frequency cell reselection when in enhanced coverage. If a higher ranking cell does not support a Cat-M1 device (that is, for example if the MIB does not include schedulingInfoSIB1-BR IE) UE 110 may attempt to camp on the next ranking cell if it supports the Cat-M1 device type and fulfills the cell selection criterion in enhanced coverage.

If cell reselection is not triggered, processor 320 will instruct UE to remain camped in enhanced coverage mode. If cell reselection is triggered in Block 545, processor may transfer control to Block 510 to determine if another cell providing normal coverage mode is available.

If in Block 530 processor 320 determines that no suitable cells providing enhanced coverage are available, processor 320 may then search other PLMNs or radio access technologies (RAT) (e.g., roam for other networks) (Block 550). UE 110 may support multiple RAT, which may include multiple cellular protocols, such as, for example, 3G, 4G, 5G, and LTE. Other RAT may include Bluetooth, WiFi, etc. UE 110 may camp in either normal coverage mode or in enhanced coverage mode while on an HPLMN or an EHPLMN.

Figure 6:
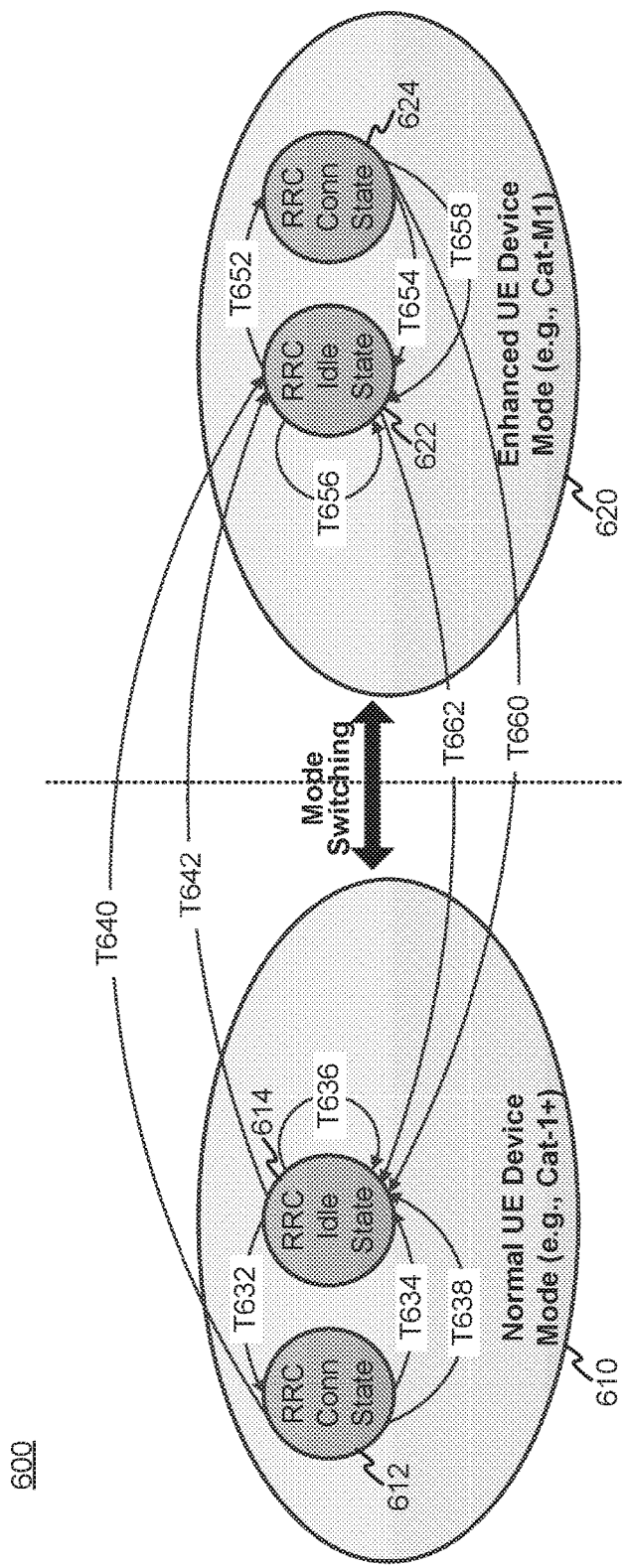
FIG. 6 is a state diagram illustrating exemplary device mode selection and switching performed by a UE.

FIG. 6 is a state diagram 600 illustrating exemplary device mode selection and switching performed by UE 110. Processor 320, which can operate jointly with modem 320, and may control the device mode selection and switching based on instructions stored in memory 330 to execute processes and/or message flows illustrated in FIGS. 5, 7A, 7B and 8. State diagram 600 does not illustrate the initial mode selection that may occur during an initial attach procedure performed by UE 110. The initial mode selection is discussed in reference to FIG. 5, and in more detail in reference to Blocks 705 through 720 in FIG. 7A.

In an embodiment, state diagram 600 represents two device modes for which UE 110 may operate in accordance with different coverage modes offered by LTE network 210. UE 110 may operate in a normal UE device mode 610, which may be used to exchange data with eNodeB 120 when normal coverage is provided by a cell associated with eNodeB 120. For example, when during normal UE device mode 610 operation, UE 110 may operate as a Cat-1+ device. UE 110 may operate in an enhanced UE device mode 620, which may be used to exchange data with eNodeB 120 when enhanced coverage is provided by a cell associated with eNodeB 120. For example, when during enhanced UE device mode 620 operation, UE 110 may operate as a Cat-M1 device.

In order to maintain continuity of data connections (e.g., not lose connection during a VoLTE call), UE 110 may switch between normal UE device mode 610 and enhanced UE device mode 620. As will be explained in more detail with reference to FIGS. 7B and 8, UE 110 may use a tracking area update (TAU) procedure to inform LTE network 210 of the device mode change. Once notified of the device mode change, LTE network 120 may use different procedures to page and exchange data with UE 110.

During operation within normal UE device mode 610, UE 110 may be in an RRC connected state 612, or an RRC idle state 614. During operation in enhanced UE device mode 620, UE 110 may also operate in an RRC connected state 622 or an RRC idle state 624. Transitions between states may occur based on events shown in FIG. 6 as "Tnnn" which are described in detail for each mode and state.

When UE 110 attached to LTE network 210 operating in normal UE device mode 610 (e.g., a Cat-1+device) and is in RRC idle state 614, it may perform cell reselection for cells providing both normal coverage and enhanced coverage as shown in FIG. 5. For example, if UE 110 is in state 614 where cell reselection is triggered and a cell providing normal coverage is selected (T636), UE may remain in RRC idle state 614 operating in normal UE device mode 610. Once in normal UE device mode 610, an RRC connection may be setup (T632), UE 110 will transition to RRC connected state 612 operating in normal UE device mode 610. In another example, if UE 110 is in state 614 where cell reselection is triggered and a cell providing enhanced coverage is selected (T642) (e.g., no cell is available that offers normal coverage), UE may transition to RRC idle state 622 and switch modes to enter enhanced UE device mode 620 (e.g., Cat-M1). UE 110 may initiate a TAU procedure upon switching device modes, where the TAU request may include the "UE radio capability information update needed" information elements (IE) message to inform LTE network that UE 110 will be operating in a different device mode. UE 110 may provide the appropriate UE capability (e.g., capabilities commensurate with a Cat-M1 device) to LTE network 210 as when attaching in enhanced UE device mode 620.

When UE 110 attached to LTE network 210 operating in normal UE device mode 610 (e.g., a Cat-1+ device) and is in RRC connected state 612, it may not attempt to switch to enhanced UE device mode 620. Regular connected mode mobility, Radio Link Failure (RLF), and RRC reestablishment procedures apply, per existing network operators' and/or 3GPP standards device requirements. Cell selection for RRC reestablishment may not consider cells in enhanced coverage in this case. Prior to switching to enhanced UE device mode 620, UE 110 may first transition to RRC idle state 614 upon an RRC connection release (T634).

In another example, when UE 110 loses coverage, system loss scanning may be performed. During system loss scanning, UE 110 may consider cells providing normal coverage and enhanced coverage as exemplified in FIG. 5. For example, when in RRC connected state 612, if UE 110 selects a cell providing normal coverage after a system loss, UE 110 will select normal coverage (T638), and automatically transition to RRC idle state 614 and stay in normal UE device mode 610. In an embodiment, UE 110 may send a TAU or Service Request to LTE network 210 if UE 110 has uplink data pending. If system loss scanning is triggered, and no suitable cell providing normal coverage is available, UE 110 may select a cell providing enhanced coverage after system loss (T640), and switch mode to enhanced UE device mode 620 upon transferring to RRC idle state 622. Switching from normal UE device mode 610 to enhanced UE device mode 620 may be initiated upon starting a TAU procedure. A TAU request (as described below in relation to FIG. 8) may include the "UE radio capability information update needed" information elements (IE) message. UE 110 may, during UE capability transfer, indicate to LTE network 110 the same UE capability as when attaching in enhanced UE device mode 620 (e.g., Cat-M1 device). If UE 110 has uplink data pending, an active flag in the TAU Request may be set.

Further referring to FIG. 6, when UE 110 is in enhanced UE device mode 620 (e.g. a Cat-M1 device) and in RRC idle state 622, it may perform cell reselection for cells providing both normal coverage and enhanced coverage as shown in FIG. 5. For example, if UE 110 is in state 622 where cell reselection is triggered and a cell providing enhanced coverage is selected (T656), UE may remain in RRC idle state 622 operating in enhanced UE device mode 620. Once in enhanced UE device mode 620 and an RRC connection is setup (T652), UE 110 may transition to RRC connected state 624 operating in enhanced UE device mode 620. In another example, if UE 110 is in RRC idle state 622 where cell reselection is triggered and a cell providing normal coverage is selected (T662), UE 110 may transition to RRC idle state 614 and switch modes to enter normal UE device mode 610 (e.g., Cat-1+). UE 110 may initiate a TAU procedure upon switching device modes, where the TAU request may include the "UE radio capability information update needed" information elements (IE) message to inform LTE network that UE 110 will be operating in a different device mode. UE 110 may provide the appropriate UE capability (e.g., capabilities commensurate with a Cat-1+device) to LTE network 210 as when attaching in normal UE device mode 610.

Note that to reselect to a cell providing normal coverage, signal offsets may be applied (e.g., $Q_{rxlevminoffset}$ and/or $Q_{qualminoffset}$). This is, enhanced coverage service mode may conceptually be considered as a visited public land mobile network (VPLMN), while normal coverage service may be conceptually considered as a "higher priority" PLMN as per, for example, 3GPP TS 36.304. When UE 110 attached to LTE network 210 operating in enhanced UE device mode 620 (e.g., a Cat-M1 device) and is in RRC connected state 624, it may not attempt to switch to normal UE device mode 610 (e.g., Cat-1+). Connected mode mobility, RLF, and RRC reestablishment procedures for enhanced mode devices (e.g., Cat-M1) apply. Prior to switching to normal UE device mode 610, UE may first transition to RRC idle state 622 upon an RRC connection release (T654).

Further referring to FIG. 6, in another example, when UE 110 loses coverage, system loss scanning may be performed. During system loss scanning, UE 110 may consider cells providing normal coverage and enhanced coverage as exemplified in FIG. 5. For example, when in RRC connected state 624, if UE 110 selects a cell providing normal coverage after a system loss, UE 110 will select normal coverage (T660), and switch mode to normal UE device mode 610 upon transferring to RRC idle state 614. Note that to reselect to a cell providing normal coverage, signal offsets may be applied (e.g., $Q_{rxlevminoffset}$ and/or $Q_{qualminoffset}$). That is, enhanced coverage service mode may conceptually be considered as a visited public land mobile network (VPLMN), while normal coverage service may be conceptually considered as a "higher priority" PLMN as per, for example, 3GPP TS 36.304. Switching from enhanced UE device mode 620 to normal UE device mode 610 may be initiated upon starting a TAU procedure. A TAU request (as described below in relation to FIG. 8) may include the "UE radio capability information update needed" information elements (IE) message. UE 110 may, during UE capability transfer, indicate to LTE network 110 the same UE capability as when attaching in normal UE device mode 610 (e.g., Cat-1+ device). If UE 110 has uplink data pending, an active flag in the TAU Request may be set. If system loss scanning is triggered, and no suitable cell providing normal coverage is available, UE 110 may select a cell providing enhanced coverage after system loss. UE 110 may select enhanced coverage and transition to RRC idle state 622 (T658), and stay in enhanced UE device mode 620. In an embodiment, UE 110 may send a TAU or Service Request to LTE network 210 if UE 110 has uplink data pending.

For both initial system selection and selection after coverage loss, if no suitable cell can be selected in either normal coverage or enhanced coverage, the existing network operator device requirements for system selection may apply. For example, UE 110 can select a VPLMN and associated access technology. When camped normally in a VPLMN and while doing a periodic search for higher priority PLMN, the UE 110 may consider both normal coverage and enhanced coverage for HPLMN/EHPLMN. Signal offsets (e.g., $Q_{rxlevminoffset}$ and/or $Q_{qualminoffset}$ may be applied in cell suitability evaluation per 3GPP TS 36.304. If a suitable cell is selected in normal coverage, UE 110 may attach to the network in a normal UE device mode 610. If a suitable cell is selected in enhanced coverage, QE 110 may further check the following conditions: 1) if cell suitability evaluation in normal coverage is fulfilled without applying $Q_{rxlevminoffset}$ and/or $Q_{qualminoffset}$, UE 110 may attach to the network as a normal mode device; 2) otherwise, UE 110 may attach to the network as an enhanced mode device.

Figure 7A:
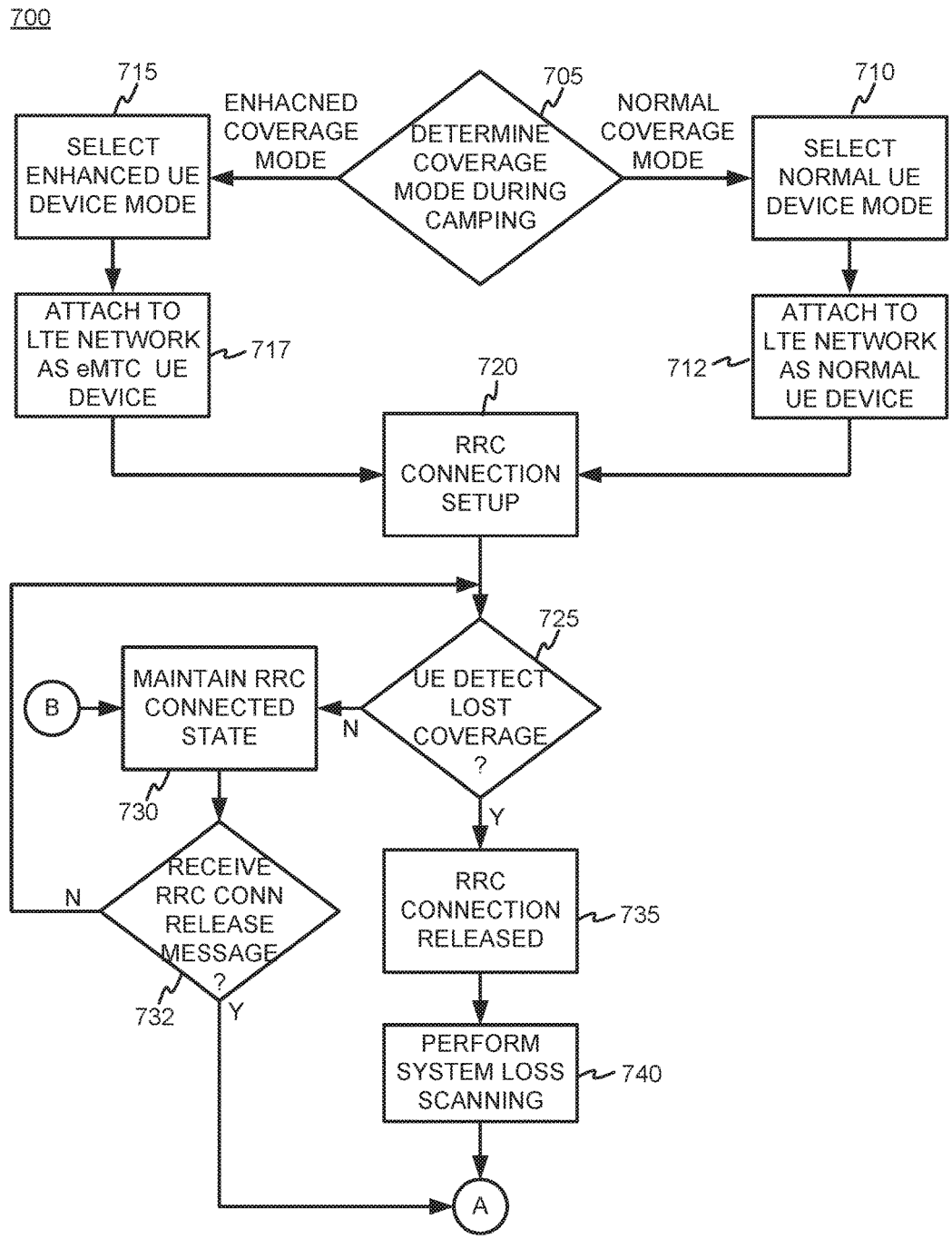
FIGS. 7A and 7B are flow charts showing an exemplary process for selecting device modes based upon cell coverage.
Figure 7B:
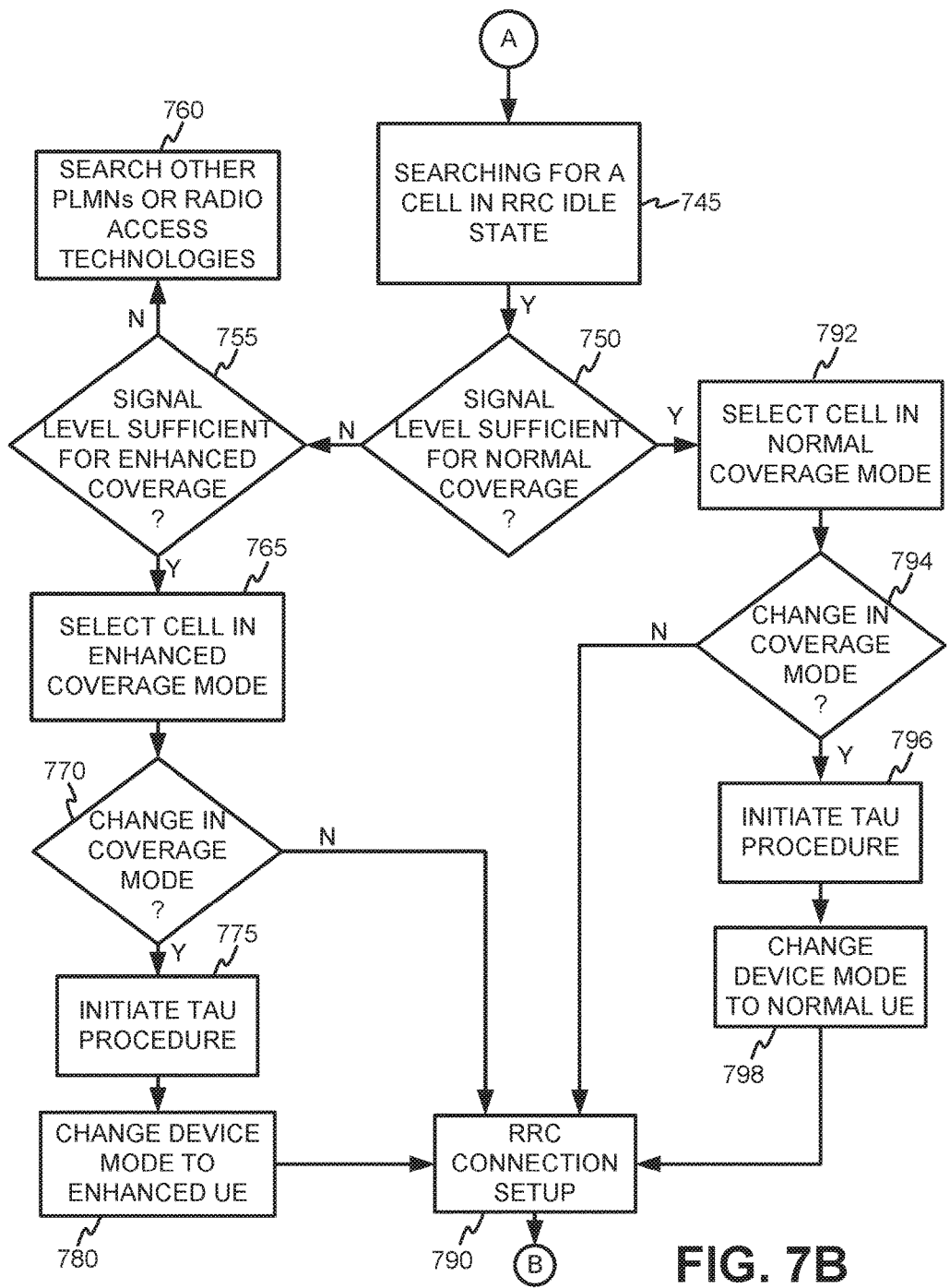

FIGS. 7A and 7B are flow charts showing an exemplary process 700 for selecting device modes based upon cell coverage. Process 700 may be performed in UE 110 by processor 320 executing instructions stored, entirely or partially, in memory 330, storage device 340, and/or ROM 350.

In FIG. 7A, process 700 may start out with a device mode selection which occurs upon UE 110 initially attaching to LTE network 210. The initial device mode selection may be determined by ascertaining the coverage mode in which UE 110 is camping. Thus, processor 320 may initially determine a coverage mode for UE 110 during camping (Block 705). The coverage mode is based on the service offered by the cell in which UE 110 camps, and may include a normal coverage mode or an enhanced coverage mode. If UE 110 is camping in a cell providing service in the normal coverage mode, processor 320 may select the normal UE device mode 610 for the operation of UE 110 (Block 710). Processor 320 may then attach to LTE network 210 in the normal UE device mode (e.g. as a Cat-1+ type device) 610 (Block 712). Alternatively, if in Block 705 processor 320 determines that UE 110 is camping in a cell providing service in the enhanced coverage mode, processor 320 may select the enhanced UE device mode 620 for the operation of UE 110 (Block 715). Processor 320 may then attach to LTE network 210 in the enhanced UE device mode as an eMTC device (e.g. as a Cat-M1 type device) (Block 717).

After a particular device mode is selected as described above, processor 320 may then setup an RRC connection with LTE network 210 to enter an RRC connected state (Block 720). Processor 320 may then detect if UE has lost coverage provided by a cell associated with eNodeB 120 (Block 725). The detection may be based upon a signal level provided by the cell, and/or messages provided by LTE network 210. Upon detecting that coverage is not been lost, processor 320 may maintain the RRC connected state (Block 730). Processor 320 may then determine if an RRC connection release message has been received from eNodeB 120 (Block 732). ENodeB 120 may send the RRC connection release message when the data channel has been inactive over a predefined period of time. If the RRC connection release message has not been received, processor 320 may continue to monitor for lost coverage in Block 725 and maintain the RRC connected state in Block 730. Upon determining that the RRC connection release message has been received in Block 732, processor 320 may transition to the RRC idle state in Block 745 as shown in FIG. 7B. Upon processor 320 determining that coverage has been lost in Block 725, processor 320 may then release the RRC connection (Block 735). Processor 320 may then perform system loss scanning in an attempt to regain coverage (Block 740). Processor 320 may then transition control to Block 745 as described below with respect to FIG. 7B.

In FIG. 7B, process 700 may continue by having processor 320 select a cell (upon initial attachment or after a coverage loss as described above in reference to FIG. 7A) or reselect a cell during the RRC idle state. Processor 320 may search for a cell while UE 110 is in the RRC idle state (Block 745). Processor 320 may then determine whether the signal level from the cell associated with eNodeB 120 is sufficient for normal coverage (Block 750). If the signal level is sufficient for normal coverage, UE 110 may exchange data with LTE network 210 while operating in a normal UE device mode via the cell. Details of UE setting up for operating in a normal UE device mode are described below in more detail with respect to Blocks 792-798 shown in FIG. 7B.

On the other hand, if processor 320 determines that the signal level is not sufficient for normal coverage in Block 750, processor 320 may then determine whether a signal level from the cell associated with eNodeB 120 is sufficient for enhanced coverage (Block 755). If the signal level is sufficient for enhanced coverage, UE 110 may exchange data with LTE network 210 while operating in an enhanced UE device mode via the cell. Details of UE 110 setting up for operating in an enhanced UE device mode are described below in more detail with respect to Blocks 765-780. Alternatively, if in Block 755 processor 320 determines that the signal level is not sufficient for enhanced coverage, processor may search for base stations associated with alternative PLMNs (e.g., consider roaming to cells outside the user's home network) and/or other radio access technologies other than LTE (Block 760).

Further referring to FIG. 7B, when in Block 750 processor determines the signal level is sufficient for normal coverage, processor 320 may then select a cell that is transmitting in normal coverage mode (Block 792). Processor 320 may then determine if the coverage mode changed from a previous coverage mode during the prior RRC connected state (Block 794). If the coverage mode has not changed, processor 320 may set up an RRC connection and enter the RRC connected state (Block 790). Processor may then transition control to Block 730 shown in FIG. 7A. If, in Block 794, processor 320 determines there has been a change in coverage mode from the prior RRC connection, processor 320 may then initiate a TAU procedure to update capability information of the UE to include a change in the device mode of the UE (Block 796). The TAU procedure will inform LTE network 210 that UE 110 will be operating in a changed device mode from the previous RRC connected state. Once notified of the UE 110 mode change, LTE network 120 may use appropriate procedures (which may be different from the enhanced UE device mode) to page and exchange data while operating in the normal UE device mode. Informing the network using the TAU procedure obviates the need for UE 110 to detach and reattach from the network, which can have the undesirable effect of interrupting data connections, such as, for example, causing UE 110 to drop a VoLTE call. Once the TAU procedure is complete, processor 320 may change the operating mode to the normal UE device mode (Block 798). Processor 320 may then initiate the RRC connection with LTE network 210 to transition UE 110 to the RRC connected state.

Further referring to FIG. 7B, when in Block 755 processor 320 determines the signal level is sufficient for enhanced coverage, processor 320 may then select the cell transmitting in an enhanced coverage mode (Block 765). Processor 320 may then determine if the coverage mode changed from a previous coverage mode during the prior RRC connected state (Block 770). If the coverage mode has not changed, processor 320 may set up an RRC connection and enter the RRC connected state (Block 790). Processor may then transition control to Block 730 shown in FIG. 7A. If, in Block 770, processor 320 determines there has been a change in coverage mode from the prior RRC connection, processor 320 may then initiate a TAU procedure to update capability information of the UE to include a change in the device mode of the UE (Block 775). The TAU procedure will inform LTE network 210 that UE 110 will be operating in a changed device mode from the previous RRC connected state. Once notified of the UE 110 mode change, LTE network 120 may use appropriate procedures (which may be different from the normal UE device mode) to page and exchange data while operating in the enhanced UE device mode. Once the TAU procedure is complete, processor 320 may change the operating mode to the enhanced UE device mode (that is, UE 110 may operate as an eMTC device such as a CAT-M1 type device) (Block 780). Processor 320 may then initiate the RRC connection with LTE network 210 to transition UE 110 to the RRC connected state (Block 790), and transfer control to Block 730 shown in FIG. 7A.

In an embodiment, when UE 110 changes device mode during a voice over LTE (VoLTE) session, processor 320 may further renegotiate codec parameters associated with the VoLTE session based on the changed device mode. During such a renegotiation, processor 320 and/or modem 360 may further send a session initiation protocol (SIP) re-INVITE to LTE network 210.

The renegotiation described above may help to preserve the VoLTE call, although with a change in service quality. The coverage enhancements associated with the enhanced UE device mode are due at least in part through repetitions at physical layer. The changes in the physical layer may come at the cost of reduced data rate and increased delay. If the same VoLTE codec rate and delay budget are used in enhanced coverage as in normal coverage, the repetition technique may not provide sufficient coverage gain to offer VoLTE services in the enhanced coverage areas. It may be helpful to reduce the data rate of VoLTE service and relax the delay requirement to better utilize the coverage enhancements and allow VoLTE services in enhanced coverage.

The following may apply to IMS VoLTE-capable UEs 110. When operating in enhanced UE device mode and a VoLTE voice call is initiated, UE 110 may support lower voice codec rate such as adaptive multirate (AMR) 4.75 Kbps, adaptive multirate wideband (AMR-WB) 6.6 Kbps, and/or enhanced voice services (EVS) 5.9 Kbps or 7.2 Kbps. UE 110 operating in enhanced UE device mode may support voice frame bundling of 2 or more frames, adaptive de-jitter buffer and/or larger jitter buffer depth (e.g. 200 ms or more), and Signaling Compression (SigComp), to improve SIP signaling efficiency and improve call setup latency. When a VoLTE call is in session and if the device switches from normal UE device mode to enhanced UE device mode or vice versa (e.g. after system loss selection), modem 360 may inform the IMS client of the mode change and the IMS client shall initiate a SIP re-INVITE to renegotiate the codec parameters as per the new device mode. This may help preserve the call, although with a change in service quality.

When a VoLTE voice call is in session and the device is in enhanced UE device mode, UE 110 may indicate to end user that the call is in "Coverage Stretching," so that the users can expect to receive lower voice quality and longer conversational delay, compared with UE 110 operating in normal UE device mode. Additionally, when the VoLTE-capable dual mode device is in enhanced UE device mode and prior to making any VoLTE calls, UE 110 may indicate to end user that call will be made or received in enhanced coverage mode with lower voice quality and longer conversational delay, and request end user to accept or reject. If the user accepts, UE 110 may stay in enhanced UE device mode, and when initiated, proceed with VoLTE calls in the enhanced UE device mode. If end user rejects, UE 110 may select a lower priority PLMN/access technology, if available, to originate or receive voice calls.

Figure 8:
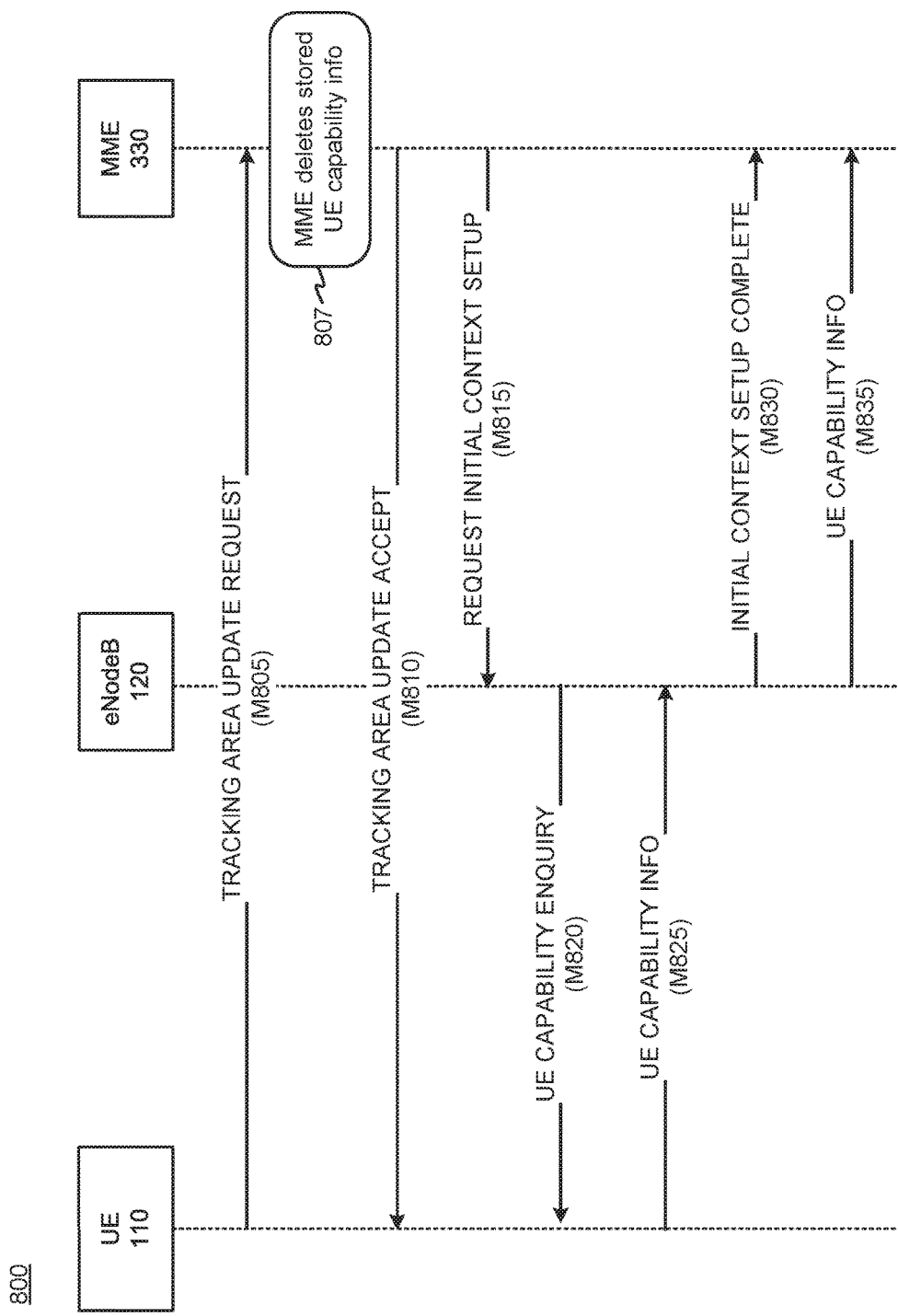
FIG. 8 is a diagram showing exemplary message flows associated with a tracking area update (TAU) procedure.

FIG. 8 is a diagram showing exemplary message flows associated with a tracking area update (TAU) procedure. Initially, UE 110 may send a tracking area update request to the MME 330 (M805). The request in M805 may specify that UE radio capability information update is needed, and may further specify the information elements (IE) being requested. Upon receiving the request in M805, MME 330 may delete the currently stored information describing the capabilities UE 110 to prepare for the updated information (Block 807). MME 330 may then send a response to UE 110 indicating that the tracking area update has been accepted (M810). MME 330 may further request an initial context setup from eNodeB 120 (M815). The request in M815 is made to eNodeB 120 without radio capability information. In response to the request in M815, eNodeB 120 may send a UE capability enquiry to UE 110 (M820). In response to M820, UE 110 may send the UE capability information to eNodeB 120 (M825). eNodeB 120 may then send an initial context setup complete message to MME 330 (M830), and then send the UE capability information, received from UE 110 in M825, to MME 330 (M835). MME 330 may then store the UE capability information received in M835 to update the replaced the old UE capability information which was deleted in Block 807.

The foregoing description of implementations provides illustration and description, but is not intended to be exhaustive or to limit the invention to the precise form disclosed. Various preferred embodiments have been described with reference to the accompanying drawings. It will be evident that modifications and changes may be made thereto, and additional embodiments may be implemented, without departing from the broader scope of the invention as set forth in the claims that follow. For example, while series of messages, states, and/or blocks have been described with regard to FIGS. 5-8, the order of the messages, states, and/or blocks may be modified in other embodiments. Further, non-dependent messaging and/or processing blocks may be performed in parallel. The specification and drawings are accordingly to be regarded in an illustrative rather than restrictive sense.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a user equipment device (UE), comprising:
    searching for a cell while the UE is in a radio resource control (RRC) idle state;
    determining if a signal level from an evolved NodeB (eNodeB) associated with the cell is sufficient for operating in a normal coverage mode;
    exchanging data with a network in a normal UE device mode via the cell, upon determining that the signal level is sufficient for operating in the normal coverage mode;
    determining if the signal level from the eNodeB associated with the cell is sufficient for operating in an enhanced coverage mode, upon determining that the signal level is not sufficient for operating in the normal coverage mode;
    exchanging data with the network in an enhanced UE device mode via the cell, upon determining that the signal level is sufficient for operating in the enhanced coverage mode; and
    initiating a tracking area update procedure (TAU) after the UE determines a change in coverage mode from a prior RRC connection.

2. The method of claim 1, wherein exchanging data with the network in the normal UE device mode further comprises:
    selecting a cell transmitting in the normal coverage mode;
    determining if the normal coverage mode servicing the UE has changed from a previous coverage mode;
    initiating an RRC connection to transition the UE to an RRC connected state in response to determining that the normal coverage mode servicing the UE did not change, and
    wherein upon determining that the normal coverage mode servicing the UE changed from the previous coverage mode, the method further comprises:
    initiating the TAU to update the network with capability information of the UE to include a change to the normal UE device mode;
    changing to the normal UE device mode; and
    initiating an RRC connection with the network to transition the UE to the RRC connected state.

3. The method of claim 2, wherein initiating the TAU further comprises:
    sending a TAU request to a mobility management entity (MME);
    receiving a tracking area update acceptance from the MME;
    receiving a UE capability enquiry from the eNodeB after the eNodeB receives a request for an initial context setup from the MME; and
    sending the capability information of the UE to the eNodeB, which is forwarded to the MME after the eNodeB provides a confirmation to the MME that the initial context setup is complete.

4. The method of claim 2, wherein the changing to the normal UE device mode further comprises:
    changing to the normal UE device mode during a voice over LTE (VoLTE) session;
    renegotiating codec parameters associated with the VoLTE session based on the change, wherein the renegotiating further comprises:
    sending a session initiation protocol (SIP) re-INVITE to the network.

5. The method of claim 1, wherein exchanging data with the network in the enhanced UE device mode further comprises:
    selecting a cell transmitting in the enhanced coverage mode;
    determining if the enhanced coverage mode servicing the UE has changed from a previous coverage mode;
    initiating an RRC connection with the network to transition the UE to an RRC connected state in response to determining that the enhanced coverage mode servicing the UE did not change, and wherein upon determining that the enhanced coverage mode servicing the UE changed from the previous coverage mode, the method further comprises:

initiating the TAU to update the network with capability information of the UE to include a change to the enhanced UE device mode;

changing to the enhanced UE device mode; and initiating an RRC connection with the network to transition the UE to an RRC connected state.

6. The method of claim 1, further comprising:

determining that the signal level from the eNodeB is not sufficient for operating in the enhanced coverage mode; and searching for base stations associated with alternative public land mobile networks (PLMNs) or radio access technologies other than LTE.

7. The method of claim 1, further comprising:

determining a coverage mode servicing the UE while the UE is camping, wherein the coverage mode comprises the enhanced coverage mode or the normal coverage mode;

selecting the normal UE device mode and attaching to the network as a normal UE device in response to determining that the coverage mode servicing the UE is the normal coverage mode; and selecting the enhanced UE device mode and attaching to the network as an enhanced Machine Type Communications (eMTC) UE device in response to determining that the coverage mode servicing the UE is the enhanced coverage mode.

8. The method of claim 1, further comprising:

setting up an RRC connection wherein the UE enters an RRC connected state;

detecting if the UE has lost service with the eNodeB;

maintaining the RRC connected state in response to detecting that the UE has not lost service, detecting if an RRC connection release message has been received, and transitioning to an RRC idle state upon detecting that the RRC connection release message was received, and wherein upon detecting that the UE has lost service, the method further comprises:

releasing the RRC connection; and performing system loss scanning to regain service.

9. A user equipment device (UE), comprising:

a communication interface;

a memory configured to store instructions; and a processor coupled to the communication interface and the memory, wherein the processor is configured to execute the instructions stored in the memory to:

search for a cell while the UE is in a radio resource control (RRC) idle state, determine if a signal level from an evolved NodeB (eNodeB) associated with the cell is sufficient for operating in a normal coverage mode, exchange data with a network in a normal UE device mode via the cell, upon determining that the signal level is sufficient for operating in the normal coverage mode, determine if the signal level from the eNodeB associated with the cell is sufficient for operating in an enhanced coverage mode, upon determining that signal level is not sufficient for operating in the normal coverage mode, exchange data with the network in an enhanced UE device mode via the cell, upon determining that the signal level is sufficient for operating in the enhanced coverage mode, and initiate a tracking area update procedure (TAU) after the UE determines a change in coverage mode from a prior RRC connection.

10. The UE of claim 9, wherein the instructions to exchange data with the network in the normal UE device mode further cause the processor to:

select a cell transmitting in the normal coverage mode;

determine if the normal coverage mode servicing the UE has changed from a previous coverage mode, initiate an RRC connection to transition the UE to an RRC connected state in response to determining that the normal coverage mode servicing the UE did not change, and wherein upon determining that the normal coverage mode servicing the UE changed from the previous coverage mode, the instructions further cause the processor to:

initiate the TAU to update the network with capability information of the UE to include a change to the normal UE device mode;

change to the normal UE device mode; and initiate an RRC connection with the network to transition the UE to the RRC connected state.

11. The UE of claim 10, wherein the instructions to initiate the TAU further cause the processor to:

send a TAU request to a mobility management entity (MME);

receive a tracking area update acceptance from the MME;

receive a UE capability enquiry from the eNodeB after the eNodeB receives a request for an initial context setup from the MME; and send the capability information of the UE to the eNodeB, which is forwarded to the MME after the eNodeB provides a confirmation to the MME that the initial context setup is complete.

12. The UE of claim 10, wherein the instructions to change to the normal UE device mode further cause the processor to:

change to the normal UE device mode during a voice over LTE (VoLTE) session;

renegotiate codec parameters associated with the VoLTE session based on the change, wherein the instructions to renegotiate further cause the processor to:

send a session initiation protocol (SIP) re-INVITE to the network.

13. The UE of claim 9, wherein the instructions to exchange data with the network in the enhanced UE device mode further causes the processor to:

select a cell transmitting in the enhanced coverage mode;

determine if the enhanced coverage mode servicing the UE has changed from a previous coverage mode;

initiate an RRC connection with the network to transition the UE to an RRC connected state in response to determining that the enhanced coverage mode servicing the UE did not change, and wherein upon determining that the enhanced coverage mode servicing the UE changed from the previous coverage mode, the instructions further cause the processor to:

initiate the TAU to update the network with capability information of the UE to include a change to the enhanced UE device mode;

change to the enhanced UE device mode; and initiate an RRC connection with the network to transition the UE to an RRC connected state.

14. The UE of claim 9, wherein the instructions further cause the processor to:

determine that the signal level from the eNodeB is not sufficient for operating in the enhanced coverage mode; and search for base stations associated with alternative public land mobile networks (PLMNs) or radio access technologies other than LTE.

15. The UE of claim 9, wherein the instructions further cause the processor to:

determine a coverage mode servicing the UE while the UE is camping, wherein the coverage mode comprises the enhanced coverage mode or the normal coverage mode;

select the normal UE device mode and attaching to the network as a normal UE device in response to determining that the coverage mode servicing the UE is the normal coverage mode; and select the enhanced eMTC UE device mode and attach to the network as an enhanced Machine Type Communications (eMTC) UE device in response to determining that the coverage mode servicing the UE is the enhanced coverage mode.

16. The UE of claim 9, wherein the instructions further cause the processor to:

set up an RRC connection wherein the UE enters an RRC connected state;

detect if the UE has lost service with the eNodeB;

maintain the RRC connected state in response to detecting that the UE has not lost service;

detect if an RRC connection release message has been received, and transitioning to an RRC idle state upon detecting that the RRC connection release message was received, and wherein upon detecting that the UE has lost service, the instructions further cause the processor to:

release the RRC connection; and perform system loss scanning to regain service.

17. A non-transitory computer-readable medium comprising instructions, which, when executed by a processor, cause the processor to:

search for a cell while a user equipment device (UE) is in a radio resource control (RRC) idle state, determine if a signal level from an evolved NodeB (eNodeB) associated with the cell is sufficient for operating in a normal coverage mode, exchange data with a network in a normal UE device mode via the cell, upon determining that the signal level is sufficient for operating in the normal coverage mode, determine if the signal level from the eNodeB associated with the cell is sufficient for operating in an enhanced coverage mode, upon determining that the signal level is not sufficient for operating in the normal coverage mode, exchange data with the network in an enhanced UE device mode via the cell, upon determining that the signal level is sufficient for operating in the enhanced coverage mode, and initiate a tracking area update procedure (TAU) after the UE determines a change in coverage mode from a prior RRC connection.

18. The non-transitory computer-readable medium of claim 17, wherein the instructions to exchange data with the network in the normal UE device mode further cause the processor to:

select a cell transmitting in the normal coverage mode;

determine if the normal coverage mode servicing the UE has changed from a previous coverage mode, initiate an RRC connection to transition the UE to an RRC connected state in response to determining that the normal coverage mode servicing the UE did not change, and wherein upon determining that the normal coverage mode servicing the UE changed from the previous coverage mode, the instructions further cause the processor to:

initiate the TAU update the network with capability information of the UE to include a change to the normal UE device mode;

change to the normal UE device mode; and initiate an RRC connection with the network to transition the UE to the RRC connected state.

19. The non-transitory computer-readable medium of claim 18, wherein the instructions to initiate the TAU further cause the processor to:

send a TAU request to a mobility management entity (MME);

receive a tracking area update acceptance from the MME;

receive a UE capability enquiry from the eNodeB after the eNodeB receives a request for an initial context setup from the MME; and send capability information of the UE to the eNodeB, which is forwarded to the MME after the eNodeB provides a confirmation to the MME that the initial context setup is complete.

20. The non-transitory computer-readable medium of claim 17, wherein the instructions to exchange data with the network in the enhanced UE device mode further causes the processor to:

select a cell transmitting in the enhanced coverage mode;

determine if the enhanced coverage mode servicing the UE has changed from a previous coverage mode;

initiate an RRC connection with the network to transition the UE to an RRC connected state in response to determining that the enhanced coverage mode servicing the UE did not change, and wherein upon determining that the enhanced coverage mode servicing the UE changed from the previous coverage mode, the instructions further cause the processor to:

initiate the (TAU) to update the network with capability information of the UE to include a change to the enhanced UE device mode;

change to the enhanced UE device mode; and initiate an RRC connection with the network to transition the UE to an RRC connected state.

* * * * *